United States Patent
Yang et al.

(10) Patent No.: US 10,422,283 B2
(45) Date of Patent: Sep. 24, 2019

(54) FUEL INJECTION DEVICE FOR A GAS TURBINE HAVING STREAMLINED BODIES WITH LOBE STRUCTURE

(71) Applicant: Ansaldo Energia Switzerland AG, Baden (CH)

(72) Inventors: Yang Yang, Nussbuamen (CH); Nicolas Noiray, Bern (CH); Michael Dusing, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 704 days.

(21) Appl. No.: 15/041,958

(22) Filed: Feb. 11, 2016

(65) Prior Publication Data
US 2016/0230668 A1 Aug. 11, 2016

(30) Foreign Application Priority Data

Feb. 11, 2015 (EP) .................................... 15154729

(51) Int. Cl.
*F23R 3/14* (2006.01)
*F23R 3/34* (2006.01)
(Continued)

(52) U.S. Cl.
CPC ............... *F02C 7/222* (2013.01); *F23R 3/20* (2013.01); *F05D 2220/32* (2013.01); *F23R 3/14* (2013.01);
(Continued)

(58) Field of Classification Search
CPC .. F23C 2900/07001; F23C 7/004; F23R 3/14; F23D 11/107; F23D 11/383; F23D 2900/14021; F23D 2900/14004
See application file for complete search history.

(56) References Cited

U.S. PATENT DOCUMENTS 5,588,824 A * 12/1996 McMillan ............... F23C 7/002
239/403
8,037,688 B2 * 10/2011 Hagen ...................... F23R 3/34
60/733
(Continued)

FOREIGN PATENT DOCUMENTS

DE       43 36 096 A1    5/1994
EP        2 642 204 A1    9/2013
(Continued)

OTHER PUBLICATIONS

Office Action (Communication Pursuant to Article 94(3) EPC) dated Dec. 1, 2017, by the European Patent Office in corresponding European Patent Application No. 15154729.6. (5 pages).
(Continued)

*Primary Examiner* — William H Rodriguez
*Assistant Examiner* — Todd N Jordan
(74) *Attorney, Agent, or Firm* — Buchanan Ingersoll & Rooney PC

(57) ABSTRACT

A fuel injection device for a gas turbine can include streamlined bodies arranged adjacent to one another in a circumferential direction. Each streamlined body can have a fuel nozzle on its trailing edge. The streamlined bodies can be split into at least a first group of streamlined bodies and a second group of streamlined bodies. All the streamlined bodies in the first group being the same and being different from the streamlined bodies in the second group. The first group of streamlined bodies includes at least two streamlined bodies adjacent to one another. Alternatively, the streamlined bodies are clustered in sets of two adjacent streamlined bodies. As yet another alternative, the streamlined bodies can be arranged such that the fuel injection device has a maximum of four-fold rotational symmetry in the plane perpendicular to the central axis.

20 Claims, 6 Drawing Sheets

(51) Int. Cl.
*F02C 7/22* (2006.01)
*F23R 3/20* (2006.01)

(52) U.S. Cl.
CPC ....... *F23R 3/34* (2013.01); *F23R 2900/00014* (2013.01)

(56) References Cited

U.S. PATENT DOCUMENTS

| | | | |
|---|---|---|---|
| 8,938,971 B2* | 1/2015 | Poyyapakkam | B01F 5/0451 239/265.13 |
| 2006/0101814 A1* | 5/2006 | Saitoh | F23R 3/286 60/377 |
| 2009/0241548 A1 | 10/2009 | Danis et al. | |
| 2012/0285173 A1* | 11/2012 | Poyyapakkam | F23C 7/004 60/772 |
| 2014/0007579 A1 | 1/2014 | Ainslie | |
| 2014/0083111 A1 | 3/2014 | Gregg et al. | |
| 2014/0123665 A1 | 5/2014 | Wood et al. | |
| 2015/0059345 A1 | 3/2015 | Hellat et al. | |
| 2018/0209211 A1* | 7/2018 | Rupel | E06B 9/262 |

FOREIGN PATENT DOCUMENTS

| | | |
|---|---|---|
| EP | 2 725 302 A1 | 4/2014 |
| EP | 2 725 303 A1 | 4/2014 |
| EP | 3023696 A1 | 5/2016 |

OTHER PUBLICATIONS

Extended European Search Report dated Jul. 24, 2015, issued by the European Patent Office in the corresponding European Patent Application No. 15154729.6. (8 pages).

Noiray et al., "Investigation of azimuthal staging concepts in annular gas turbines", Combustion Theory and Modelling, 15:5, 2011, pp. 585-606.

Office action dated Sep. 14, 2018 for European Patent Application Serial No. 15154729.6.

Examination Report for Gulf Coast Council Application No. GC 2016-30837 dated Sep. 25, 2018.

* cited by examiner

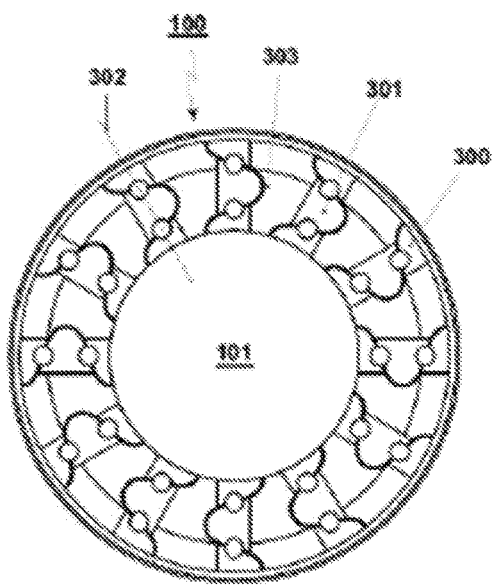
PRIOR ART
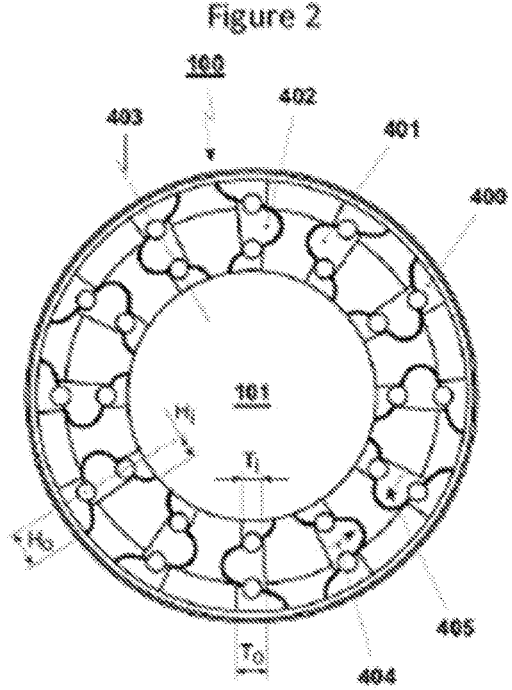
PRIOR ART

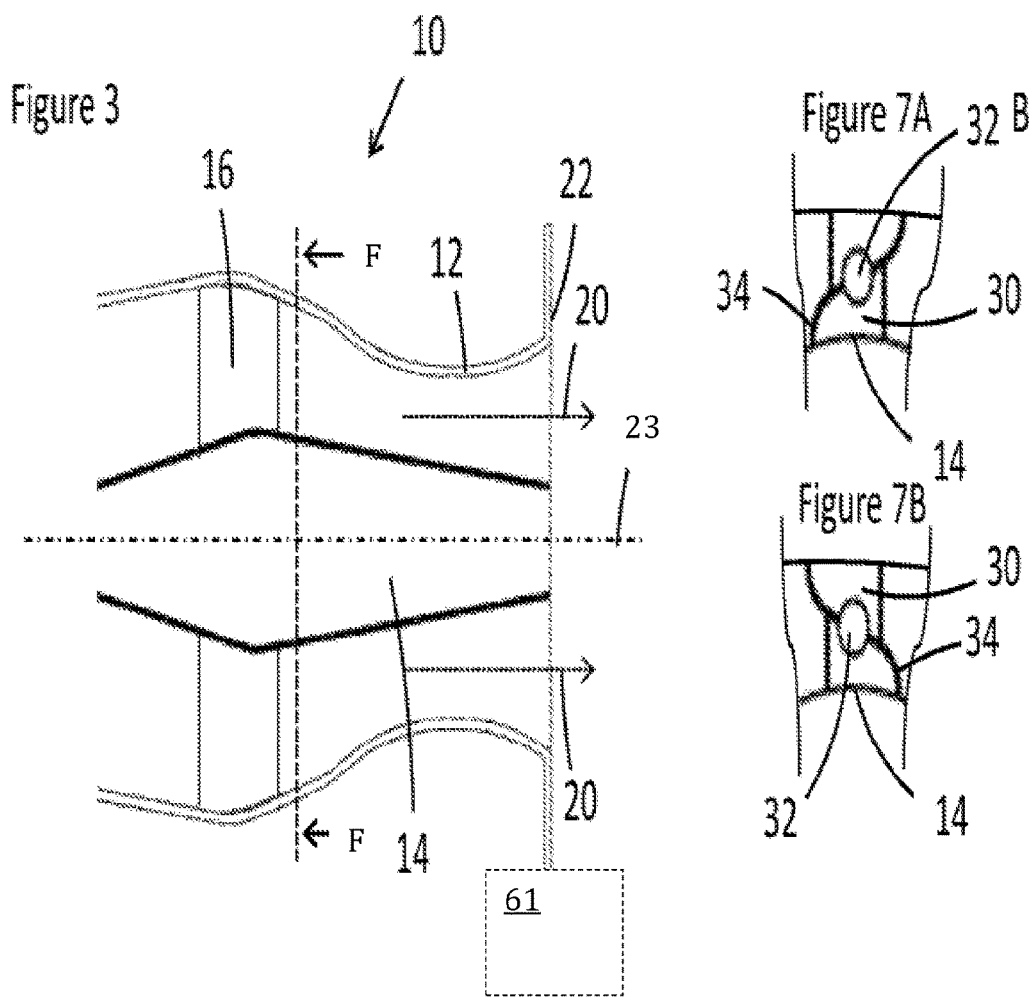

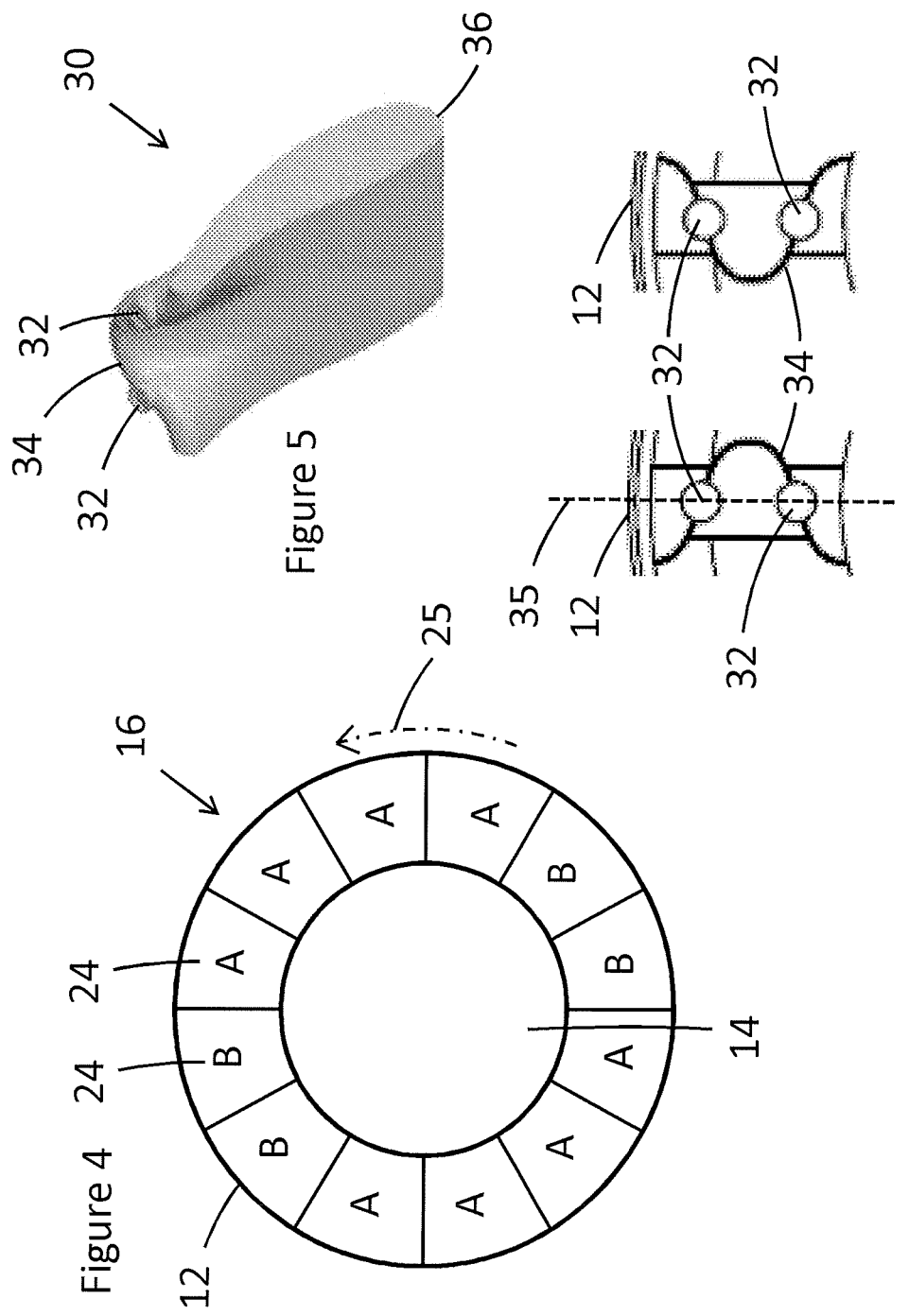

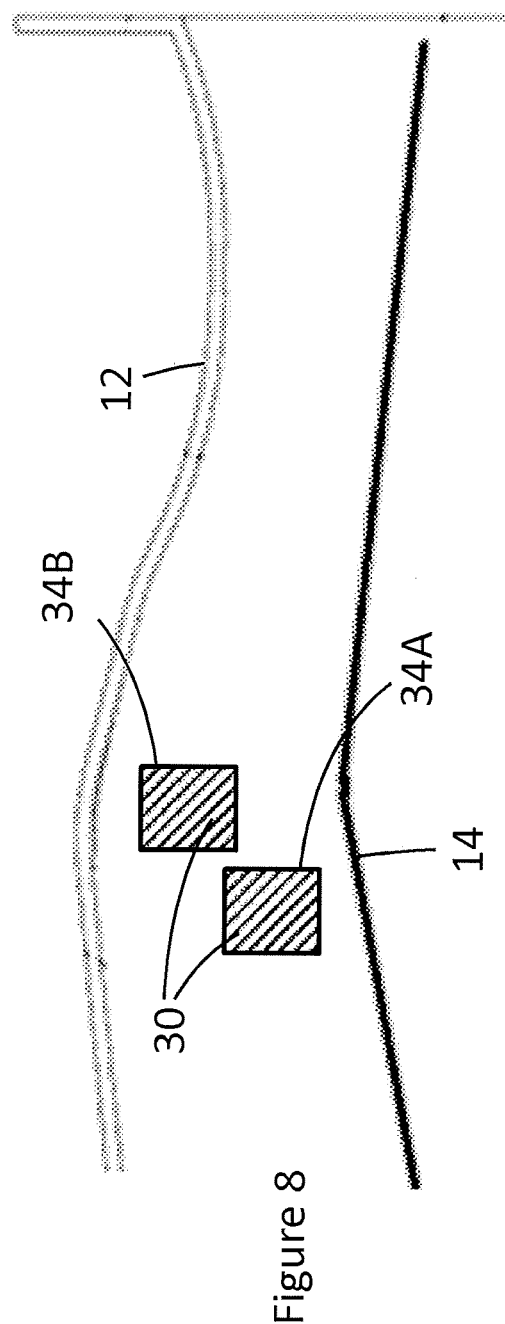

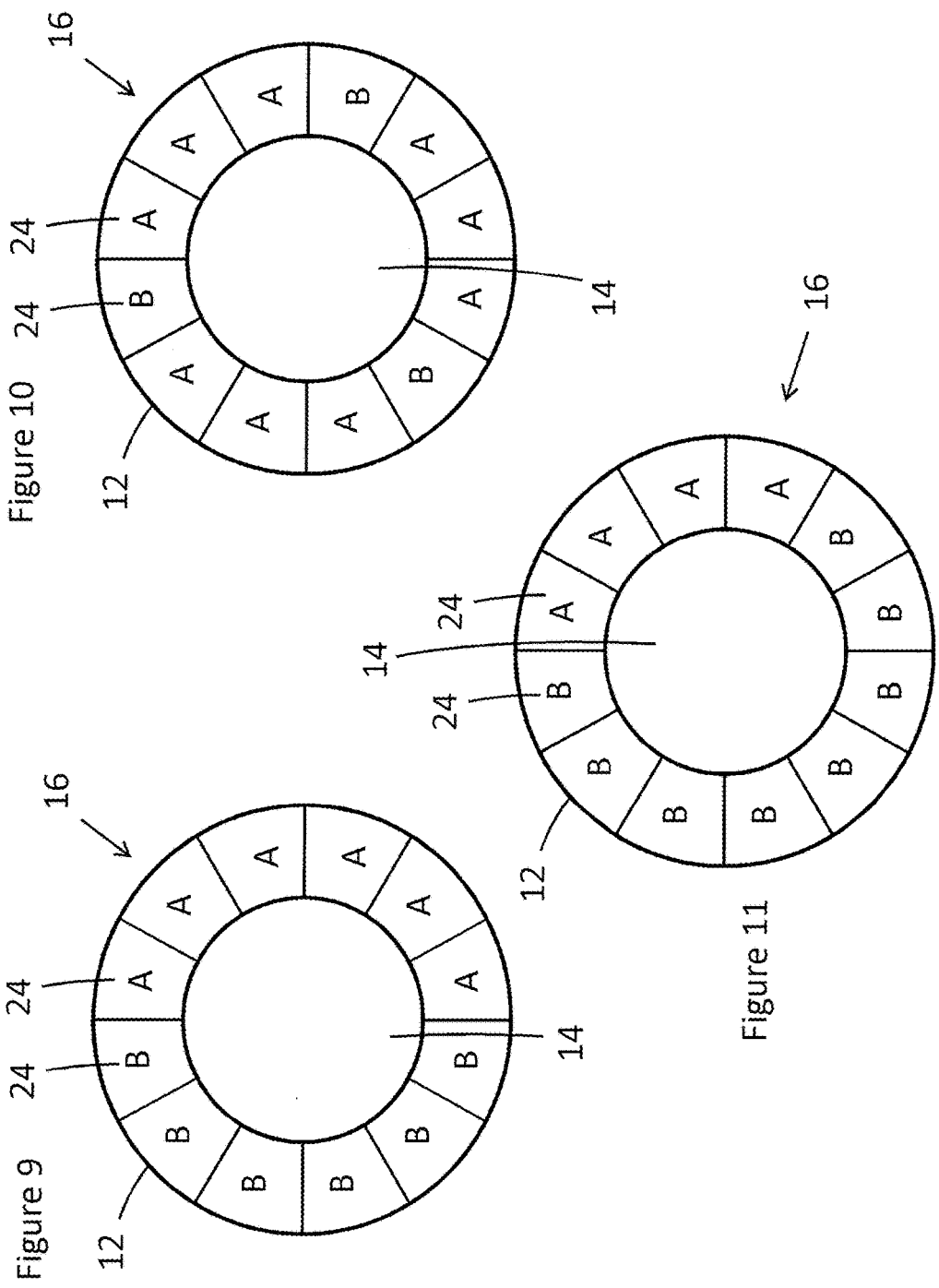

FUEL INJECTION DEVICE FOR A GAS TURBINE HAVING STREAMLINED BODIES WITH LOBE STRUCTURE

TECHNICAL FIELD

The present disclosure relates to fuel injection devices for gas turbines, and more specifically to the arrangement of streamlined bodies within fuel injection devices.

BACKGROUND OF THE INVENTION

Existing centre body burners for gas turbines have an injection lance with 12 fingers and with two nozzles on each finger. An example from EP 2725303 is shown in FIG. 1, showing a reheat burner arrangement 100 with a centre body 101 in a cross-sectional view. The leading edge area of each streamlined body 300 has a profile wherein, with reference to a central plane 302 of the streamlined bodies 300, the leading edges are provided with at least one lobe 303, or at least two complementary lobes. The surface curvature of the lobes 303 run in conjunction with each other in the same direction. The traverse or quasi-traverse deflections from the central plane of two adjacent streamlined bodies (300), which form the lobes 303, are in alignment with each other.

FIG. 2 shows another reheat burner arrangement 100 from EP 2725303 in a cross-sectional view. The leading edge area of each streamlined body 400 has a profile wherein, with reference to a central plane 403 of the streamlined bodies 400, the leading edges are provided with at least one lobe 401, 402, or at least two complementary lobes, in opposite transverse directions 404, 405. The traverse deflection from the central plane of two adjacent streamlined bodies 400 which form the lobes 401, 402 are inverted in that the transition from a planar leading edge region to the deflections is smooth with a surface curvature representing a function with a continuous first derivative.

These existing centre body burners for gas turbines show good performance in terms of emissions and OTDF/RTDF (overall temperature distribution factor/radial temperature distribution factor). However, it has been appreciated that the thermoacoustic pulsation level might not be negligible in these existing centre body burners and that improved designs would be advantageous.

SUMMARY OF THE INVENTION

The invention is defined in the appended independent claims to which reference should now be made. Advantageous features of the invention are set forth in the dependent claims.

According to a first aspect of the invention, there is provided a fuel injection device for a gas turbine, comprising a plurality of streamlined bodies arranged in a ring adjacent to one another in a circumferential direction relative to a central axis of the fuel injection device, each streamlined body comprising a trailing edge and at least one streamlined body comprising a fuel nozzle on the trailing edge, wherein the plurality of streamlined bodies is split into at least a first group of streamlined bodies (A) and a second group of streamlined bodies (B), all the streamlined bodies in the first group (A) being the same and being different from the streamlined bodies in the second group (B), and all the streamlined bodies in the second group (B) being the same, wherein the first group of streamlined bodies (A) comprises at least two streamlined bodies adjacent to one another, and/or wherein the streamlined bodies are clustered in sets of two adjacent streamlined bodies, and in which at least one of the sets is different from the other sets, and/or wherein the streamlined bodies are arranged such that the fuel injection device has a maximum of four-fold rotational symmetry in the plane perpendicular to the central axis. The current invention as described above allows for damping of rotating thermoacoustic modes, as rotating modes are locked in one place and cannot simply move around the circumference of the burner to avoid any given damper (e.g. Helmholtz damper). In combination with this, the presence of groups of lobes pointing in the same lobe direction, provides mixing by combined vortices. This can provide large scale mixing whilst simplifying the alleviation of pulsation issues.

In further embodiments, the fuel injection device has a maximum of three-fold, two-fold or one-fold rotational symmetry in the plane perpendicular to the central axis. In one embodiment, the first group and the second group each have the same number of streamlined bodies. In one embodiment, the second group comprises at least two streamlined bodies adjacent to one another in the circumferential direction. In one embodiment, all the streamlined bodies are the same radial distance from the central axis. In one embodiment, the first group is split into at least two sectors (a) and the second group is split into at least two sectors (b), and the sectors a and sectors b are arranged in a configuration abab around the ring.

In one embodiment, at least half of the streamlined bodies are opposite a different streamlined body relative to the central axis. In another embodiment, at least two-thirds of the streamlined bodies are opposite a different streamlined body relative to the central axis. In a further embodiment, all of the streamlined bodies are opposite a different streamlined body relative to the central axis. These features can help improve the thermoacoustic behaviour of the system.

In one embodiment, the plurality of streamlined bodies additionally comprises a third group of streamlined bodies (C, 30), all the streamlined bodies (30) in the third group (C) being the same and being different from the streamlined bodies (30) in the first group (A) and the second group (B).

In one embodiment, the trailing edges of the first group are arranged into lobes and have one of the following lobe combinations, and in which the trailing edges of the second group are arranged into lobes and have one of the following lobe combinations: one or more full lobes and up to two half lobes (FIG. 6A, 6B) or two half lobes (FIG. 7A, 7B). Single-nozzle designs (such as that in FIGS. 7A, 7B) will fit for lower channel heights (the gap between the centre body and the outer wall). With other lobe shapes, there is a shear layer near the streamlined body hub/root. Flows are therefore separated in that layer.

In one embodiment, the streamlined bodies of the first group have a right-handed lobe structure, and the streamlined bodies of the second group have a left-handed lobe structure. In one embodiment, the trailing edges (34, 34A, 34B) of the first group are arranged into lobes and have a lobe combination, and in which the trailing edges (34, 34A, 34B) of the second group are arranged into lobes and are of the same lobe combination as the first group.

In one embodiment, at least one of the streamlined bodies of the first group has at least one fuel nozzle and at least one of the streamlined bodies of the second group has at least one fuel nozzle, and the at least one fuel nozzle of the first group has a different size to the at least one fuel nozzle of the second group. In a further embodiment, all of the at least one nozzles in the first group are the same size, and all of the at least one nozzles in the second group are the same size, the nozzle size being different in the first group compared to the second group.

According to a second aspect of the invention, there is provided a gas turbine comprising a fuel injection device as described above.

In one embodiment, the gas turbine additionally comprises at least one damper downstream of the fuel injection device arranged to reduce vibrations and/or pulsations caused by circumferential thermoacoustic modes.

According to a third aspect of the invention, there is provided a method of operating a fuel injection device for a gas turbine as described above, comprising the step of injecting fuel through the at least one fuel nozzle. In one embodiment, at least one of the streamlined bodies of the first group has at least one fuel nozzle and at least one of the streamlined bodies of the second group has at least one fuel nozzle, and fuel is injected at a different rate through the at least one fuel nozzle of the first group of streamlined bodies and the at least one fuel nozzle of the second group of streamlined bodies. In a further embodiment, fuel is injected at the same rate through all of the at least one nozzles in the first group, and fuel is injected at the same rate through all of the at least one nozzles in the second group, the injection rate being different in the first group compared to the second group.

According to a fourth aspect of the invention, there is provided a method of designing a gas turbine combustor, comprising the steps of manufacturing a fuel injection device as described above, installing the fuel injection device in a gas turbine, monitoring the gas turbine to ascertain where to add dampers to the gas turbine combustor to reduce vibrations and/or pulsations caused by circumferential thermoacoustic modes, and adding at least one damper into the gas turbine combustor to reduce vibrations and/or pulsations caused by circumferential thermoacoustic modes.

BRIEF DESCRIPTION OF THE DRAWINGS

An embodiment of the invention will now be described by way of example only and with reference to the accompanying drawings in which:

FIG. 1 shows a circumferential cross-section of a prior art reheat burner arrangement;

FIG. 2 shows a circumferential cross-section of another prior art reheat burner arrangement;

FIG. 3 shows a longitudinal cross-section of a burner arrangement according to the present invention;

FIG. 4 shows a view along cross-section F-F of FIG. 3;

FIG. 5 shows a perspective view of a streamlined body;

FIG. 6A shows a circumferential cross-section view of a type of streamlined body;

FIG. 6B shows a circumferential cross-section view of a type of streamlined body;

FIG. 7A shows a circumferential cross-section view of an alternative type of streamlined body;

FIG. 7B shows a circumferential cross-section view of an alternative type of streamlined body;

FIG. 8 shows a longitudinal cross-section of a burner arrangement showing the location of staged lobes;

FIG. 9 shows a view along cross-section F-F of FIG. 3 in an alternative embodiment;

FIG. 10 shows a view along cross-section F-F of FIG. 3 in another alternative embodiment; and FIG. 11 shows a view along cross-section F-F of FIG. 3 in a fourth alternative embodiment.

DETAILED DESCRIPTION OF THE PREFERRED EMBODIMENTS

Figure 12:
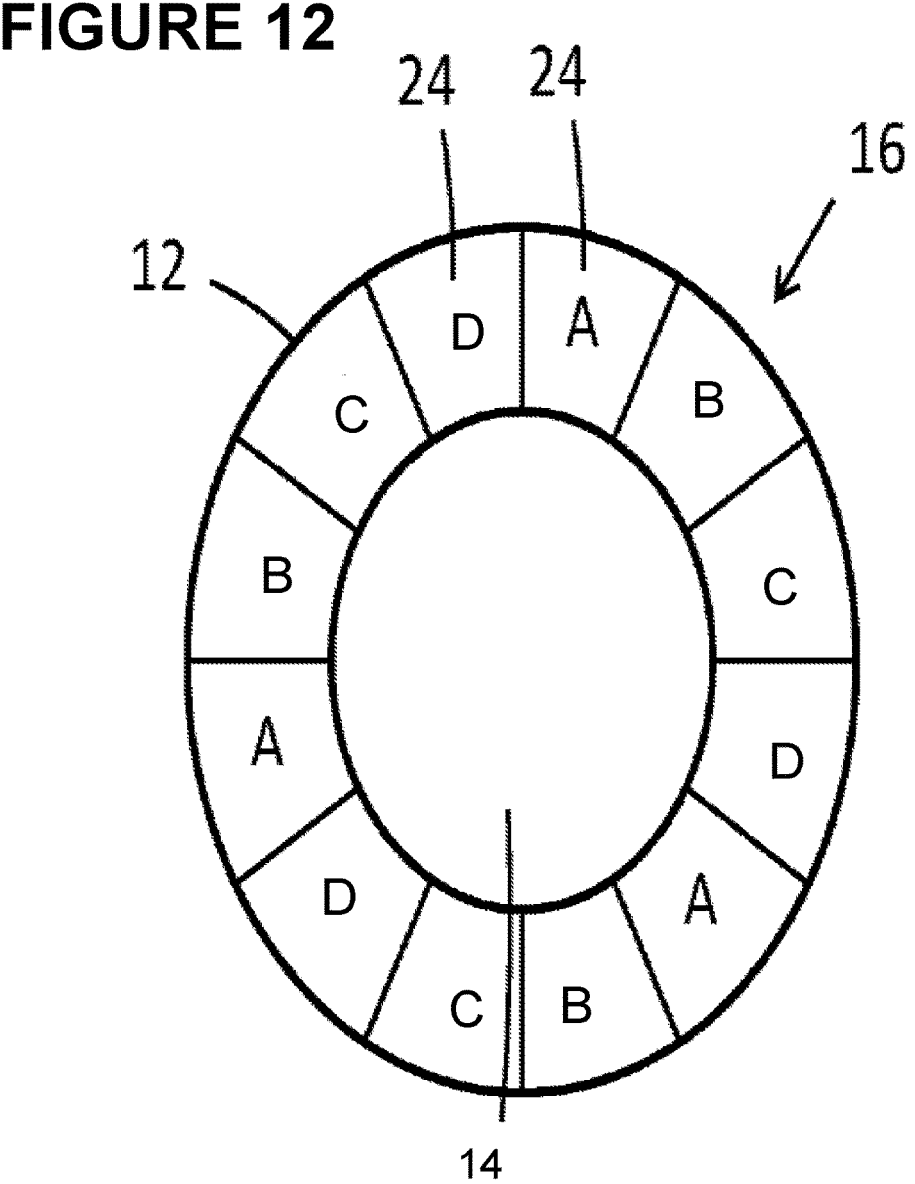
FIG. 12 shows a view along cross-section F-F of FIG. 3 in a fifth alternative embodiment.

FIG. 3 shows a longitudinal cross-section through a burner 10. Burner 10 comprises an outer wall 12, a centre body 14, and a fuel injection device 16. Fluid flow direction 20 is also shown. It should be noted that FIG. 3 shows the location of the fuel injection device 16 but does not show any of the features of the fuel injection device 16. The combustor is downstream in the fluid flow direction of the burner 10, and part of the combustion chamber wall 22 can also be seen. The central axis 23 of the burner is also shown.

To illustrate the invention, FIG. 4 shows a cross-section through burner 10 along A-A looking upstream towards fuel injection device 16. No details of the fuel injection device 16 are shown, but the fuel injection device is shown divided into a plurality (in this case twelve) segments 24, with each segment labelled A or B. The segments are arranged in a ring around the circumference of the burner 10 with the segments adjacent to one another in a circumferential direction 25, and are preferably all arranged in the same plane perpendicular to the central axis.

In each segment a streamlined body 30 as described below in FIG. 5 is placed. Segments labelled A contain a streamlined body 30 of one type, and segments B contain a streamlined body 30 of a second type. For ease of reading, segments A, B shall henceforth simply be described as streamlined bodies A, B.

A streamlined body 30 is shown in FIG. 5. The streamlined body 30 comprises fuel nozzles 32, a streamlined body trailing edge 34 and a streamlined body leading edge 36.

The streamlined body trailing edge 34 describes a sinusoidal pattern. The streamlined body trailing edge is split into lobes, each lobe being half of a full cycle of a sine wave. For the streamlined body of FIG. 5, a lobe is the portion of the streamlined body trailing edge 34 between the two fuel nozzles 32 (a lobe is generally considered to start and end at this point on the lobe regardless of the location of the fuel nozzles, i.e. on the streamlined body centre line 35 shown in FIG. 6A). The streamlined body trailing edge 34 includes a number of lobes; in this case, the streamlined body trailing edge comprises one full lobe and two half lobes.

FIGS. 6A and 6B show streamlined bodies as they would be seen from the perspective shown in FIG. 4. FIG. 6A shows a right-handed streamlined body with a right-handed lobe structure, in which the lobe points clockwise around the circumference of the burner 10. FIG. 6B shows a left-handed streamlined body with a left-handed lobe structure, in which the lobe points anticlockwise around the circumference of the burner 10.

Returning to FIG. 4, each streamlined body A (in each segment A) contains a right-handed streamlined body as shown in FIG. 6A, and each streamlined body labelled B (in each segment B) contains a left-handed streamlined body as shown in FIG. 6B.

FIGS. 7A and 7B show a different option for the structure of the streamlined body trailing edge 34. In each of these Figures, the streamlined body trailing edge is shown from the perspective of A-A in FIG. 3. FIG. 7A shows a right-handed streamlined body, whereas FIG. 79 shows left-handed streamlined body.

In FIGS. 7A and 7B, a single nozzle design of streamlined body 30 is shown between outer wall 12 and centre body 14. Fuel nozzle 32 is shown on trailing edge 34. Extrapolating from the definition given in describing FIG. 4, the trailing edge 34 in FIGS. 7A and 7B comprises two half lobes.

Streamlined bodies with staged lobes may also be used, where the trailing edge of each streamlined body is split into two parts with one part downstream of the other, as shown in FIG. 8. The streamlined body is split into two parts, resulting in two trailing edge parts 34A, 34B. Aside from this, the streamlined body can be the same as shown in FIGS. 5, 6A and 6B, for example.

FIG. 4 shows one possible configuration of streamlined bodies A and B, and FIGS. 9, 10 and 11 show examples of alternative configurations. The most basic configuration is ab (sector a followed by sector b to complete a full ring of streamlined bodies around the burner), where a number of streamlined bodies A is followed by a number of streamlined bodies B. FIGS. 9 and 11 show examples of this, with FIG. 9 showing a symmetrical example (same number of streamlined bodies A as streamlined bodies B) and FIG. 11 showing an asymmetrical example (different numbers of streamlined bodies A and B).

Another possible configuration is abab (sector a, b, a, b to complete a full ring of streamlined bodies), with two groups of streamlined bodies A interspersed with two groups of streamlined bodies B. FIGS. 4 and 10 are examples of this configuration. This pattern can be extended to ababab, abababab and so on. Each letter a, b denotes a sector comprising at least one streamlined body; that is, a sector is a set of one or more identical streamlined bodies. Various other patterns are possible beyond those specifically illustrated, and using the example of 12 streamlined bodies, one extreme example would be ab with AAAAAAAAAAAB or AAAAAAAAAABB and another would be abababab with ABABABABABBB or ABABABABAABB.

In the description above, one particular example of the invention is described for clarity, namely FIG. 4 in combination with lobes as shown in FIGS. 6A and 6B. Instead of the streamlined bodies of FIGS. 6A and 6B, the streamlined bodies of 7A and 7B or other types of lobes may be used, such as staged lobes.

In a similar vein, the alternatives in FIGS. 9, 10 and 11 have been described using FIGS. 6A and 6B as an example, and again, instead of the streamlined bodies of FIGS. 6A and 6B, the streamlined bodies of 7A and 7B, or other types of lobes may be used.

Extending this theme, it is not necessary to use a right-handed streamlined body such as that shown in FIG. 6A for streamlined bodies A with its left-handed counterpart (from FIG. 6B) for streamlined bodies B (i.e. it is not necessary to use two lobes of the same lobe combination; a lobe combination is lobes of a similar structure that are different due to a different orientation). Instead, any right-handed streamlined body (e.g. FIG. 6A) could be used with any left-handed streamlined body (e.g. FIG. 7B), and indeed more generally any combination of two different types of streamlined bodies can be used, as long as the streamlined bodies A are different from the streamlined bodies B.

It is also possible to have more than two different types of streamlined bodies. As an example, four different types of streamlined bodies A, B, C, D may be used in various patterns, such as abcd with streamlined bodies in the configuration AAABBBCCCDDD.

In the case of multiple lobes, then the streamlined bodies may be denoted as right handed when the full lobe closest to the central axis of the burner is pointing clockwise around the circumference of the burner, and left handed when the full lobe closest to the central axis of the burner is pointing anticlockwise around the circumference of the burner.

Another factor that can help lock down the rotating modes is elements of asymmetry in the streamlined body pattern. The streamlined body patterns described herein generally do not have many-fold rotational symmetry about the longitudinal axis of the fuel injection device (and of the burner). The prior art examples in FIG. 1 (twelve-fold symmetry or 12 degrees of symmetry, i.e. rotation by any integer multiple of 30°) and FIG. 2 (six-fold rotational symmetry, rotation by any integer multiple of 60°) have at least six-fold symmetry. In contrast, fuel injection devices according to the invention (particularly with 12 or fewer streamlined bodies) will generally have four-fold symmetry and mostly only three-fold symmetry or less. To illustrate, the example in FIG. 4 has one-fold rotational symmetry, so only by any integer multiple of 360°, FIG. 9 also has one-fold rotational symmetry, FIG. 10 has three-fold rotational symmetry, by any integer multiple of 120°, and FIG. 11 again has one-fold rotational symmetry. Examples also exist with two-fold symmetry (rotation by any integer multiple of 180°), such as AAABBBAAABBB and ABCDEFABCDEF, and four-fold symmetry, such as ABCABCABCABC.

Another factor that can help to reduce rotating modes is linked to the number of streamlined bodies on opposite sides of the fuel injection device (in the plane perpendicular to the longitudinal axis of the burner) that are opposite different streamlined bodies. In FIG. 9, for example, all of the streamlined bodies A are opposite a streamlined body B, and in FIG. 11 two thirds of the streamlined bodies are opposite a different streamlined body (all the streamlined bodies A and their opposing four streamlined bodies B). Other examples include ABCBCACABCAB and ABCDABCD-ABCD, where all of the streamlined bodies are opposite a different streamlined body. An example of the ABCDAB-CDABCD arrangement for different groups of the streamlined bodies is shown in FIG. 12 in which streamlined bodies A are the streamlined bodies shown in FIG. 6A, streamlined bodies B are the streamlined bodies shown in FIG. 6B, streamlined bodies C are the streamlined bodies shown in FIG. 7A and streamlined bodies D are the streamlined bodies shown in FIG. 7B.

Another factor that can help lock down the rotating modes is differences between repeating sets of streamlined bodies. That is, the streamlined bodies are split (clustered or grouped) into at least two sets with the same number of streamlined bodies, and at least two of the at least two sets are different from one another. For example, with sets of 2 and with 12 streamlined bodies, at least one of the 6 sets must be different from the others (i.e. there must be at least two different sets). As a more specific example, ABABA-BABABBB has two sets, AB and BB clustered AB, AB, AB, AB, AB, BB. This should be the case for any number or arrangement of sets—generally many different splits are possible but regardless of the split there are always at least two different types of set. In the example ABABABA-BABBB, the pattern could also be split at a different point (into BA, BA, BA, BA, BB, BA) or with a different number of sets ABA, BAB, ABA, BBB or ABAB, ABAB, ABBB or ABABAKABABBB. Regardless of the split, there are always at least two different types of sets. As another example, AAAABBBBBBBB also always has at least two different sets, AA and BB. The number of different types of set may well be variable depending on the split, for example four instead of two if split AA, AB, BB, BB, BB, BA rather than AA, AA, BB, BB, BB, BB).

In another more general interpretation, at least one of the sets must be different from the others and each set must have exactly two streamlined bodies. This provides a broader number of options that can fit within the invention. For example, ABBAABBAABBA provides two different types of set when split into sets of two, but does not provide at least two different sets of four, since it can be split into the set ABBA three times, i.e. ABBA, ABBA, ABBA). An example such as ABCDABCDABCD also provides two different types of set with sets of two but not with sets of four.

It is not necessary to have all of these different factors (two or more identical streamlined bodies adjacent to one another, elements of asymmetry in the streamlined body pattern, different streamlined bodies on opposite sides of the fuel injection device, at least two different types of set of two or more streamlined bodies) to lock down the rotating modes, and one or more of these factors may suffice.

In a method of operating a fuel injection device as described above, fuel is injected through the fuel nozzles in the trailing edge of the streamlined bodies. The fuel is then typically mixed downstream and then ignited. The flame front in centre body burners, for example, generally shows a uniform shape with uniform temperature distribution. The fuel is generally evenly distributed within the flow and there is one shear layer near the lobe hub (the centre body). This is due to the radius of the centre body, and gives a small circumferential velocity that is not typically strong enough to generate large scale mixing vortices. The inner shear layer shows lower fuel mass fraction. The shear layer separates into two counter rotating flow directions. This indicates that the standing wave is modulated by two counter rotating modes (circumferential thermoacoustic modes). Fuel may be injected at a different rate through the fuel nozzle or nozzles of the first group and the fuel nozzle or nozzles of the second group. Differences in fuel flow could be achieved by different sized nozzles and/or by different fuel pressures, for example.

It is advantageous to be able to damp these rotating modes to reduce vibrations and pulsations. In a method of designing a gas turbine combustor, a fuel injection device as described above is first manufactured. The fuel injection device is then installed in a gas turbine, and the gas turbine is monitored to ascertain the nature of the modes. Once the modes have been characterized, one or more dampers 61, as indicated in broken line in FIG. 3, can be added to the gas turbine to reduce vibrations and pulsations caused by the modes.

Although a burner 10 with a centre body 14 is provided, the invention may be provided in a burner without a centre body. The burner could be provided in a can or an annular combustor. The burner shown in the examples has a circular longitudinal cross section (with respect to the longitudinal axis of the burner), but other shapes of burner are possible, such as rectangular, in which case the ring of streamlined bodies could be rectangular or substantially rectangular.

In the examples above, 12 segments 24 (and therefore 12 streamlined bodies 30) have been provided, but other numbers of streamlined bodies are also possible.

A limited number of streamlined body types designs been described in this application; the invention could also work with other designs of streamlined body.

One or more fuel nozzles 32 have been provided in each of the streamlined bodies described above, and in some embodiments every streamlined body has at least one fuel nozzle. However, it is not a requirement that every streamlined body has a fuel nozzle. For example, in some embodiments every other streamlined body has a fuel nozzle. The position of the nozzle and the number of nozzles on a streamlined body is also flexible. For example, in FIGS. 6A and 6B, alternatively just one nozzle may be provided, either in the position of one of the two nozzles currently shown or in another position, such as at the point on the trailing edge midway between the outer wall 12 and the centre body 14. Fuel nozzles may be one size in the first group of streamlined bodies and a different size in the second group of streamlined bodies. This can allow different fuel flow from the first group of streamlined bodies compared to the second group.

The streamlined body trailing edge 34 may describe various patterns instead of a sinusoidal pattern.

Streamlined body trailing edges 34 may have various numbers of lobes, and are not limited to the examples given above. For example, the design shown in FIG. 6A may be extended to two full lobe and two half lobes, or one or both of the half lobes in the design in FIGS. 6A and 6B could be removed.

In FIG. 8, a staged streamlined body is shown with trailing edge 34A upstream of trailing edge 34B and closer to the fuel injection device central axis, but trailing edge 34A may also be downstream of trailing edge 34B. The two parts of the streamlined body are shown completely separate and spaced in the fuel injection device central axis direction and overlapping in the axial direction, but they may be either joined or separate, and either spaced or overlapping in both the central axis direction and the axial direction. The staged streamlined body described herein has two stages; but other embodiments may have three or more stages.

Various modifications to the embodiments described are possible and will occur to those skilled in the art without departing from the invention which is defined by the following claims.

REFERENCE SIGNS

| | | | |
|---|---|---|---|
| 10 | burner | 36 | streamlined body leading edge |
| 12 | outer wall | | |
| 14 | centre body | 100 | reheat burner arrangement |
| 16 | fuel injection device | 101 | centre body |
| 20 | fluid flow direction | 300 | streamlined body |
| 22 | combustion chamber outer wall | 301 | lobe |
| | | 302 | central plane |
| 23 | burner central axis | 303 | lobe |
| 24 | segment | 400 | streamlined body |
| 25 | circumferential direction | 401 | lobe |
| 30 | streamlined body | 402 | lobe |
| 32 | fuel nozzle | 403 | central plane |
| 34, 34A, 34B | streamlined body trailing edge | 404 | transverse direction |
| | | 405 | transverse direction |
| 35 | streamlined body centre line | | |
| OTDF | overall temperature distribution factor | | |
| RTDF | radial temperature distribution factor | | |

The invention claimed is:

1. A fuel injection device for a gas turbine, comprising:
   a plurality of streamlined bodies arranged in a ring adjacent to one another in a circumferential direction relative to a central axis of the fuel injection device, each streamlined body having a trailing edge and at least one streamlined body having a fuel nozzle on the trailing edge;
   wherein the plurality of streamlined bodies is split into at least a first group of streamlined bodies and a second group of streamlined bodies; all the streamlined bodies in the first group being the same and being different in lobe structure from the streamlined bodies in the second group, and all the streamlined bodies in the second group being the same;
   wherein the streamlined bodies are arranged such that the fuel injection device has a maximum of four-fold rotational symmetry in a plane perpendicular to the central axis.

2. The fuel injection device of claim 1, wherein
   the streamlined bodies of the first group have a right-handed lobe structure, and the streamlined bodies of the second group have a left-handed lobe structure.

3. The fuel injection device of claim 2, wherein the first group and the second group each have the same number of streamlined bodies.

4. The fuel injection device of claim 2, wherein the second group comprises: at least two streamlined bodies adjacent to one another in the circumferential direction, or in which all the streamlined bodies are the same radial distance from the central axis.

5. The fuel injection device of claim 2, in which at least half of the streamlined bodies are opposite a different streamlined body relative to the central axis.

6. The injection device of claim 2, in which each of the streamlined bodies of the first group has at least one fuel nozzle and each of the streamlined bodies of the second group has at least one fuel nozzle, and the at least one fuel nozzle of the first group has a different size to the at least one fuel nozzle of the second group.

7. A gas turbine comprising: the fuel injection device of claim 2.

8. The gas turbine of claim 7, comprising: at least one damper downstream of the fuel injection device arranged to reduce vibrations and/or pulsations caused by circumferential thermoacoustic modes.

9. A method of designing a gas turbine combustor, comprising:
   manufacturing a fuel injection device according to claim 2;
   installing the fuel injection device in a gas turbine;
   monitoring the gas turbine to ascertain where to add dampers to the gas turbine combustor to reduce vibrations and/or pulsations caused by circumferential thermoacoustic modes; and
   adding at least one damper into the gas turbine combustor to reduce vibrations and/or pulsations caused by circumferential thermoacoustic modes.

10. The fuel injection device of claim 1, in which the first group is split into at least two sectors and the second group is split into at least two sectors, and the sectors a of the first group and sectors b of the second group are arranged in a configuration abab around the ring such that each sector b of the second group is between sectors a of the first group.

11. The fuel injection device of claim 1, wherein the plurality of streamlined bodies additionally comprises: a third group of streamlined bodies, all the streamlined bodies in the third group being the same and the streamlined bodies of the third group being different in lobe structure from the streamlined bodies in the first group and the streamlined bodies of the third group being different in lobe structure from the streamlined bodies of the second group.

12. The fuel injection device of claim 1, in which the trailing edges of the first group are arranged into lobes and have a lobe combination, and in which the trailing edges of the second group are arranged into lobes.

13. The fuel injection device of claim 1, in which the trailing edges of the first group are arranged into lobes and in which the trailing edges of the second group are arranged into lobes, each of the lobes of the first group being one of: a full lobe and a half lobe, each of the lobes of the second group being one of: a full lobe and a half lobe.

14. The fuel injection device of claim 1, wherein all the streamlined bodies are the same radial distance from the central axis.

15. The fuel injection device of claim 14, wherein each of the streamlined bodies of the first group has at least one fuel nozzle and each of the streamlined bodies of the second group has at least one fuel nozzle, and the at least one fuel nozzle of the first group has a different size to the at least one fuel nozzle of the second group.

16. The fuel injection device of claim 15, in which the first group is split into at least two sectors and the second group is split into at least two sectors, and the sectors a of the first group and sectors b of the second group are arranged in a configuration abab around the ring such that each sector b of the second group is between sectors a of the first group.

17. The fuel injection device of claim 14, wherein the plurality of streamlined bodies additionally comprises: a third group of streamlined bodies, all the streamlined bodies in the third group being the same and the streamlined bodies of the third group being different in lobe structure from the streamlined bodies in the first group and the streamlined bodies of the third group being different in lobe structure from the streamlined bodies of the second group.

18. The fuel injection device of claim 17, in which the trailing edges of the first group are arranged into lobes and in which the trailing edges of the second group are arranged into lobes.

19. A method of operating a fuel injection device for a gas turbine, the fuel injection device having a plurality of streamlined bodies arranged in a ring adjacent to one another in a circumferential direction relative to a central axis of the fuel injection device, each streamlined body having a trailing edge and at least one streamlined body having a fuel nozzle on the trailing edge; wherein the plurality of streamlined bodies is split into at least a first group of streamlined bodies and a second group of streamlined bodies; all the streamlined bodies in the first group being the same and being different in lobe structure from the streamlined bodies in the second group, and all the streamlined bodies in the second group being the same; wherein the streamlined bodies are arranged such that the fuel injection device has a maximum of four-fold rotational symmetry in a plane perpendicular to the central axis, the method comprising:
   injecting fuel through the fuel nozzle.

20. The method of claim 19, wherein each of the streamlined bodies of the first group has at least one fuel nozzle and each of the streamlined bodies of the second group has at least one fuel nozzle, and wherein the injecting fuel through the fuel nozzle comprises:

injecting fuel at different rates through at least one fuel nozzle of the first group of streamlined bodies and at least one fuel nozzle of the second group of streamlined bodies.

* * * * *